United States Patent [19]

Williams

[11] Patent Number: 4,574,835

[45] Date of Patent: Mar. 11, 1986

[54] VALVE COMPONENT

[75] Inventor: David G. Williams, South Wirral, Great Britain

[73] Assignee: The Metallic Valve Company Limited, Birkenhead, England

[21] Appl. No.: 667,477

[22] PCT Filed: Feb. 17, 1984

[86] PCT No.: PCT/GB84/00045

§ 371 Date: Oct. 19, 1984

§ 102(e) Date: Oct. 19, 1984

[87] PCT Pub. No.: WO84/03343

PCT Pub. Date: Aug. 30, 1984

[30] Foreign Application Priority Data

Feb. 22, 1983 [GB] United Kingdom ................. 8304811

[51] Int. Cl.$^4$ ............................................. F16K 15/14
[52] U.S. Cl. ............................. 137/512.15; 137/516.11; 137/854
[58] Field of Search ......... 137/512.15, 516.11–516.23, 137/854

[56] References Cited

U.S. PATENT DOCUMENTS

| | | | |
|---|---|---|---|
| 666,145 | 1/1901 | Kennedy | 137/512.15 |
| 1,385,147 | 7/1921 | Prellwitz | 137/516.13 |
| 1,634,949 | 7/1927 | LeValley | 137/854 X |
| 1,833,141 | 11/1931 | Leinert . | |
| 4,173,985 | 11/1979 | Kirpichenkov . | |
| 4,402,342 | 9/1983 | Paget | 137/512.15 |

FOREIGN PATENT DOCUMENTS

| | | |
|---|---|---|
| 671526 | 9/1929 | France . |
| 2030739 | 11/1970 | France . |
| 2135981 | 12/1972 | France . |
| 6299 | of 1910 | United Kingdom ........... 137/512.15 |
| 684461 | 12/1952 | United Kingdom . |
| 751330 | 6/1956 | United Kingdom . |
| 752308 | 7/1956 | United Kingdom . |
| 786095 | 11/1957 | United Kingdom . |
| 820384 | 9/1959 | United Kingdom . |
| 870386 | 6/1961 | United Kingdom . |
| 890546 | 3/1962 | United Kingdom . |
| 923215 | 4/1963 | United Kingdom . |
| 992602 | 5/1965 | United Kingdom . |
| 996040 | 6/1965 | United Kingdom . |
| 1017035 | 1/1966 | United Kingdom . |
| 1358111 | 6/1974 | United Kingdom . |

Primary Examiner—Robert G. Nilson
Attorney, Agent, or Firm—Dennison, Meserole, Pollack & Scheiner

[57] ABSTRACT

A valve plate for a plate-type non-return valve includes at least one valve closure portion and at least one resilient flexible guide arm connecting with the valve closure and the guide arm or arms are configured to include a continuously curved portion generally extending as a spiral from a central hub.

10 Claims, 2 Drawing Figures

VALVE COMPONENT

BACKGROUND OF THE INVENTION

The present invention relates to an improved valve component for a plate-type non-return valve and particularly although not exclusively relates to an improved valve plate and improved non-return valve incorporating such improved valve plate.

Plate-type non-return valves are well known and include a valve body or seat produced by casting, forging or milling and having annular slots therein, a valve closure means which is a valve plate having "kidney shaped" or annular slots therein in regions which are not to overlie the slots in the valve seat, and a valve stop or guard comprising a body having annular slots therein generally corresponding to but not aligned with the slots of the valve seat. The valve plate is normally clamped at a central region between the valve guard and seat although there is sufficient clearance between the seat and guard in the region of the slotted portion of the valve plate to permit displacement of the valve plate during the operation of a compressor or the like so as to lift off the valve plate from the valve seat and allow air to pass through annular slots in the valve seat plate and thence through the annular slots in the valve plate and through the slots in the guard plate. In use, following the opening of a valve by creation of a sufficient pressure differential between the inlet and outlet sides of the valve, a change in the pressure differential is created which enables the valve plate to return by virtue of the back-pressure of the air and the natural resilience of the metal of the plate clamped in its central region and possibly assisted by additional spring means or plate type springs so that the valve plate closes the slots in the valve seat and thus act as a non-return valve. To ensure a smooth and efficient operation of the valve, damper plates may also be provided. The plate type springs and damper plates often also have central flexible spring or guide arms which are clamped between the valve seat and guard. Many prior devices of this type of valve have been disclosed and, purely by way of example, reference is made to British Patent Specification Nos. 438139, 1140633 and 1406278.

It is important in the design of the valve plates (and other plates) to provide a plate which has a high "lift" and thus high efficiency whilst at the same time ensuring that the flexing and bending necessary for achieving of the high lift do not result in a shortened life of the component as a result of fatigue and breakage. It is furthermore important in the production of a valve plate to produce a plate which is as free as possible from undesirable stresses in the material thereof. It is still further important that the valve plate be provided with optimum area of through passage for the flow of air for increased efficiency.

Generally, all hitherto known valve plates of circular outline have a continuous outer periphery and annular concentric passages or slots running between normally radially extending webs interconnected with the concentric rings of the metal plate forming the valve closure portion. In the central regions of known plates there exists a concentric circular portion or arcuate portions forming a hub for the mounting by clamping of the plate between the valve seat and valve guard and the interconnection between the innermost, concentric main closure ring and the central mounting hub is by way of one, two or at a maximum three connecting spring or guide arms which each consist of an arcuate portion concentric with the plate and having a straight portion or a portion which is formed by cutting a straight slot through a radial web interconnecting the rings and which slot is defined by a straight edge or straight edges. Reference will be made herein to "guide arms" and it should be understood such term is to cover flexible spring or connecting arms of components other than valve plates, i.e. cushion or damper plates and plate type springs. As mentioned these straight edge portions of the guide arms are generally formed by a straight slot extending either radially or inclinedly across a radial web. Whilst many variations in disposition and size have been proposed these generally comprise the essential characteristics of known valve plates. Certain spring or cushion (damper) plates have been proposed which are normally located between the valve plate and guard plate and act on the valve plate in resilient manner to provide for improved performance of the valve. It is known from Canadian Patent Specification No. 573260 for a cushion plate to have a portion with straight, radially, extending support arms and with two small slots being provided in the outer circular periphery to allow for relative deflection.

SUMMARY OF THE INVENTION

It is an object of the present invention to provide an improved valve component such as a valve plate, a cushion plate or a spring plate and associated valve components.

It is to be understood from the foregoing and also the following description and claims that there are various aspects of the invention which can be considered separately or in combination. Whilst reference is mainly made to valve plates, features of the invention may equally well be incorporated in cushion or damper plates or in plate type springs forming a valve component. Furthermore, where reference is made to a valve closure portion or the like there may be considered the equivalent primary function portion of an equivalent component, e.g. of a cushion plate or a plate type spring. In addition various features of the invention may be included in known slotted, concentric ring valve plates or the like components.

According to the present invention there is provided a valve plate for a plate-type non-return valve including one or more valve closure portions, preferably, respectively of generally circular outline or of generally circular arrangement, and one or more flexible guide arms each having a continuously curved portion extending at continually increasing distance relative to the centre of the plate and preferably extending as a spiral or generally as a spiral.

In a preferred embodiment of the invention there is provided a valve plate for a plate-type non-return valve comprising a central circular hub portion having a plurality of flexible guide arms extending therefrom and each connecting in a peripheral region of the plate with an associated one of a plurality of valve closure portions; each said guide arm having a curved portion in a central region of the plate extending from said hub portion at increasing radial distance and leading to a radially extending portion which joins the valve closure portion in an outer peripheral region; each said closure portion being separated from adjacent closure portions by a radially extending slot and having main closure portions on each side of said radially extending portion.

Also according to the invention there is provided a valve plate for a plate-type non-return valve in which one or more flexible guide arms extend from a central region outwardly to an outer peripheral region of the plate and respectively merges or merge in said peripheral region into a valve closure portion or portions.

Still further according to the invention there is provided a valve plate for a plate non-return valve including one or more central portion or portions to be clamped between a valve seat and guide and at least four guide arms each extending from said central portion or a respective one of said central portions and leading to valve closure means.

Whilst the following drawings show a continuous central hub it is envisaged aspects, such as the continuously spirally (or otherwise) curved arm or arms, may be applied to existing or other valve plates and thus spirally curved arms may each extend from an outer valve closure portion inwardly to separate, discrete central portions by means of which the plate is mounted by clamping the central portions between the valve seat and guard.

The or each spiral guide arm or arms which may be located in an inner region and extend outwardly to a valve closure portion or may be located outwardly and extend inwardly to a valve closure portion, provides or provide a continuous stress-free or stress reduced extension since straight or angled portions do not exist as hitherto between the concentric and arcuately curved portions.

Furthermore, in accordance with the important aspects of the invention including spiral guide arms and also of a smaller spacing or slots between the guide arms than existed hitherto between known arcuate concentric guide arms, the length of the guide arm or guide arms may be substantially increased relative to known arms whilst not increasing and possibly even reducing the radial extension of the region adjacent the central hub normally occupied by known spring arms for a particular sized plate. If desired, the length of the arm or arms may extend at least over 360°/n—where n is the number of spring or guide arms whilst still maintaining the region adjacent the central hub within desirable confines to provide for satisfactory throughput of air through the valve.

In respect to that aspect of the invention involving the continuously curved portion of the or each guide arm extending as a spiral or generally as a spiral, it is preferably what might be considered as a compound curve or volute and the width of the arm is preferably kept constant or the sides parallel although the arms may be tapered, if desired.

The continuously curved portion of the or each guide arm preferably leads to a generally straight, radially extending portion which preferably increases in width in an outward direction.

The feature of a guide arm first connecting in an outer peripheral region with the valve closure means is an important feature which provides important advantages. In the preferred embodiment, one valve closure means is provided for each guide arm and the arm preferably bisects the respective closure into two portions which extend radially and reduce in width in an inward direction.

Whilst the valve plate is described as being circular or of circular arrangement, other shapes such as polygonal, e.g. rectangular may be used.

In its broadest aspect of the present invention comprises a valve component for a plate-type non-return valve including at least one closure portion when the component is a valve plate or other primary function portion and at least one flexible guide arm integrally connecting with said at least one closure portion, with the or each guide arm having a continuously curved, main portion extending at continuously increasing distance relative to the centre of the plate or at continuously decreasing distance relative to the centre of the plate.

BRIEF DESCRIPTION OF THE DRAWINGS

The invention will be described further, by way of example, with reference to the accompanying drawings, in which:-

DETAILED DESCRIPTION

Figure 1:
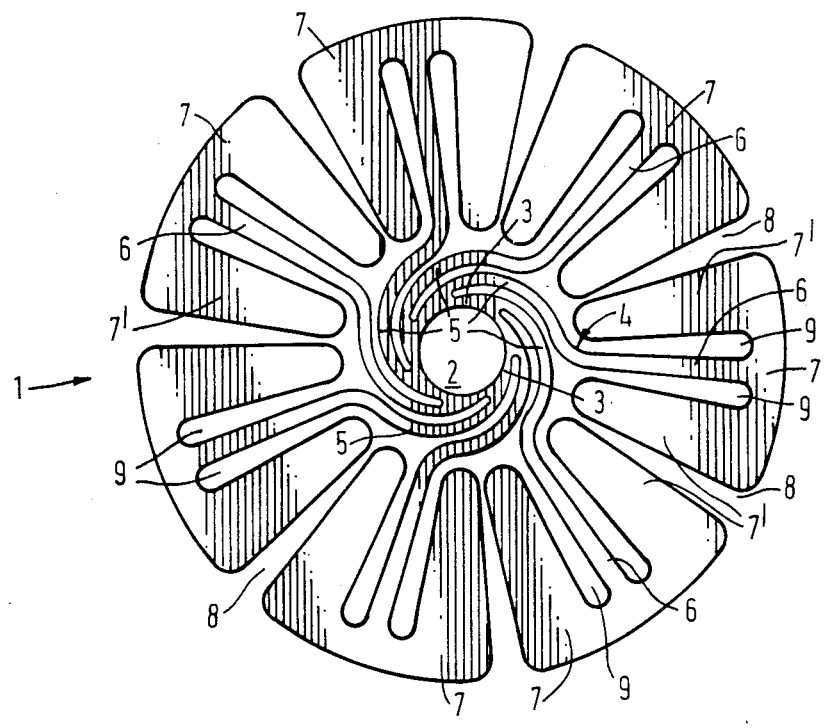
FIG. 1 is a plan view of a preferred embodiment of a valve plate.

A valve plate 1 is illustrated in FIG. 1 and is of constant thickness (1 mm) and shaped out of hardened or finished steel by an etching technique. The plate 1 comprises a central hub portion 3 defining a central, circular aperture 2 provided for mounting and clamping the valve plate 1 between a valve body or valve seat (not shown) and a cage or guard plate (not shown) in known manner. Seven symmetrically arranged guide arms 4 for friction free guidance of valve closure portions extend from the hub portion 3 and each comprises a continuously curved portion 5 extending at continually increasing distance from the centre of the plate. The curved portion 5 leads to a generally straight and radially extending portion 6 which runs into a main valve closure portion 7 and bisects such into two symmetrical portions generally comprising two radially and inwardly extending portions or fingers 7'. It will be observed that the slotted spaces 8 exist between adjacent fingers 7' and that the edges defining such slots 8 converge towards the centre of the plate. Similarly, edges defining the radially extending spaces 9 between the fingers 7' and radially extending guide arm portions 6 also converge, to a lesser extent, towards the centre of the plate.

It will be appreciated that the guide arm portions 5 are of considerable length relative to the curved guide arms of known valve plates of comparable size and thus provide for advantageous resilient guidance of the main closure portion 7 without undesired stressing of the arms. In addition, the length of the portions 6 add considerably to the overall length of the guide arms 4. When approaching the maximum lift position of the plate, a "tilting" effect occurs in that the radially outer edge of each closure portion 7 rises upwardly from the closed position of the valve and is the first portion to abut against the valve cage or guard because of the support bending action produced by the guide arm 4. Subsequent to abutment of the outer edge of closure portion 7, the radially inward ends of the fingers 7' also continue to be deflected upwardly to a slight extent and thus provide a cushioning effect to the operation of the valve plate which will permit additional springs, dampers or cushion plates to be dispensed with or reduced, if desired, thereby reducing the number of components in a valve and thus the cost and risk of failure.

It should be appreciated that the continually curved portion of the plate is of major significance in that it extends outwardly at preferably continually increasing distance relative to the hub or centre of the plate. In this respect the curve 5 of each arm is a compound curve of continually increasing radius in an outward direction and such as to produce a guide arm of constant width. The curve of the arm is a spiral or generally spiral and preferably a volute or convolute with each arm forming a portion of a spiral. It is of course possible for the curve to be other than spiral, for example, an arc of a circle or wave form which extends at continually increasing distance relative to the centre of the plate. Shapes or arrangement other than circular may be envisaged.

It will be appreciated by persons skilled in the art that the ports and passages in the valve seat and valve guard will be provided generally corresponding to portions 7' so as to cooperate in comparable manner to that of known valves to provide for opening and closing of the valve.

The plate may be produced by mechanical machining or, preferably, by various etching techniques as are known to persons skilled in such art.

Whilst seven guide arms are illustrated, any number may be provided and it is considered highly desirable that at least four and possibly five or six or, preferably, seven or more guide arms and associated main valve closure portions 7 be provided.

The provision of discrete main valve closure portions on the end of each resilient guide arm is one novel feature of the invention not hitherto proposed and the shape of each main closure portion may be varied from that illustrated without departing from the scope of the present invention. It is also envisaged that the outer periphery of the plate may be continuous and with long flexible guide arms (preferably at least four arms) each extending from the central hub via a continuously curved portion leading to an outer main valve closure portion and running into such in an outer region and, possibly in a continuous peripheral region to provide for a guide arm of considerable length.

Instead of radially extending slots 8 and 9, annular type slots defined by arcuate fingers may be provided.

Figure 2:
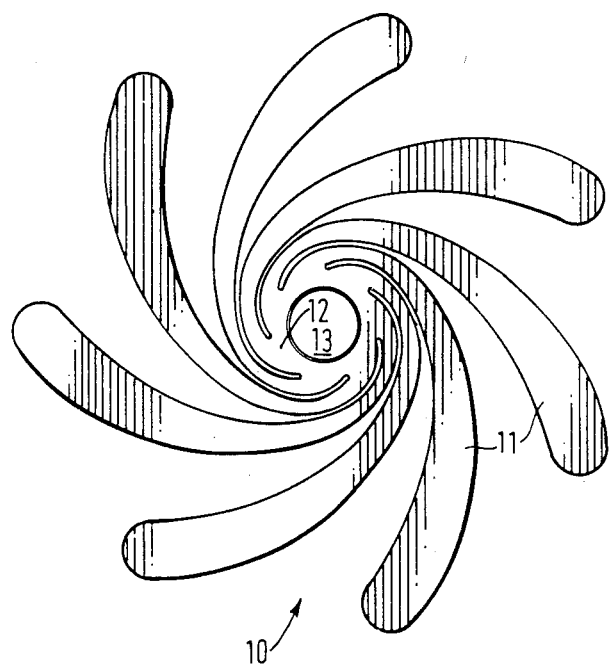
FIG. 2 is a schematic illustration of an alternative embodiment of the valve plate.

FIG. 2 is a schematic illustration comprising a plan of an alternative embodiment of a valve plate 10 according to the invention.

The plate 10 comprises seven flexible guide arms 11 also functioning as the closure means which each extend from a central hub portion 12 which defines a circular central aperture 13 for mounting of the plate between the valve seat and guard (not shown) but which have apertures cooperatively corresponding to the shape of plate 10.

The arms 11 are formed as a continuous spiral or other compound curve with the width increasing outwardly to increase the valve closing action of the arms. The formation of the valve plate in this manner provides for a stress-free or substantially stress-free valve plate. It is even envisaged that a continuous circular or other peripheral rim may be provided interconnecting these free ends of the valve plate illustrated in FIG. 2.

I claim:

1. A valve plate for a plate-type non-return valve comprising a central circular hub portion having a plurality of resiliently flexible guide arms extending therefrom and each connecting in a peripheral region of the plate with an associated one of a plurality of separate valve closure portions; each said guide arm having a curved portion in a central region of the plate extending from said hub portion at continuously increasing radial distance and leading to a radially extending portion which joins the valve closure portion in an outer peripheral region; each said closure portion being separated from adjacent closure portions by a radially extending slot and having main closure portions on each side of said generally radially extending portion.

2. A valve plate for a plate-type non-return valve including a plurality of discrete, spaced apart valve closure portions and a plurality or resiliently flexible guide arms each leading to a one of said valve closure portions and with each said guide arm having a continuously curved portion in a central region of the plate and extending from a central portion of the plate at continuously increasing distance relative to the center of the plate with said curved portion merging outwardly into a portion extending outwards; wherein the outwardly extending portion of each guide arm merges with the valve closure portion in an outer peripheral region of the valve closure plate; and wherein each valve closure portion has two valve closure portions extending inwardly; the edges of adjacent closure portions and guide arms defining spaces or passages whch extend from the outermost periphery of the plate to the central portion of the plate.

3. A valve plate as claimed in claim 2 in whch the main body of the valve closure portion of each arm of the valve comprises two radially extending finger portions extending from the outer periphery, radially inwardly on either side of the radially extending portion of each guide arm.

4. A valve plate as claimed in claim 3 in which a radially extending slot is provided between the outer edges of adjacent radially extending finger portions of adjacent arms.

5. A valve plate for a plate-type non-return valve including a valve closure means and a plurality of curved, resiliently flexible guide arms leading to said valve closure means, characterised by the feature that the valve closure means comprise a plurality of discrete, circumferentially spaced apart valve closure portions and each one of the plurality of flexible guide arms leads from a central region of the plate to an outer peripheral region of the plate and leads to a respective one of said valve closure portions, with each said guide arm having a continuously curved portion extending at continuously increasing distance relative to the center of the plate, and wherein a plurality of continuous slots or passages each extend between adjacent valve closure portions from outwardly of the periphery of the plate to the central region of the plate.

6. A valve plate for a plate-type non-return valve including a plurality of discrete, spaced apart valve closure portions and a plurality of flexible guide arms including spiral curved portions each leading to a one of said valve closure portions and in which each valve closure portion has two valve closure portions extending inwardly, and with each said guide arm having a continuously curved portion extending at continuously increasing distance relative to the center of the plate, the spiral curved portion of each guide arm is a compound curve, such as a volute, said continuously curved portion of each guide arm being in a central region of the plate and merging outwardly into a portion extending radially outwards, and wherein said radially extending portion of each guide arm merges with the valve closure portion in an outer peripheral region of the valve closure plate.

7. A valve plate as claimed in claim 6 in which the main body of the valve closure portion (7) of each arm of the valve comprises two radially extending closure (finger) portions (7') extending from the outer periphery, radially inwardly on either side of the radially extending portion (6) of each guide arm (4).

8. A valve plate as claimed in claim 7, in which a radially extending slot (8) is provided between the outer edges of adjacent radially extending finger closure portions (7') of adjacent arms (6).

9. A valve plate for a plate-type non-return valve in which a plurality of resiliently flexible guide arms extend from a central region via a continuously curved portion outwardly to an outer peripheral region of the plate and each guide arm merges in said peripheral region into a valve closure portion circumferentially spaced apart from and discrete from each adjacent valve closure portion, and wherein each said guide arm divides each valve closure portion so that each said valve closure portion extends inwardly from the peripheral region.

10. A valve plate as claimed in claims 1 or 9, in which said plate is flat and said guide arms have at least portions which are each of spiral shape.

* * * * *